(12) United States Patent
Sugiyama et al.

(10) Patent No.: US 7,810,828 B2
(45) Date of Patent: Oct. 12, 2010

(54) SPLASH SHIELD FOR AUTOMOBILE HAVING VERTICAL WALLS AND SHIELDING MEMBER THEREFOR

(75) Inventors: Hideki Sugiyama, Nagoya (JP); Shigeki Watanabe, Frankfurt am Main (DE)

(73) Assignees: Hayashi Telempu Co., Ltd., Aichi (JP); Mitsubishi Motors Corporation, Tokyo (JP)

( * ) Notice: Subject to any disclaimer, the term of this patent is extended or adjusted under 35 U.S.C. 154(b) by 422 days.

(21) Appl. No.: 11/935,031

(22) Filed: Nov. 5, 2007

(65) Prior Publication Data

US 2008/0150273 A1 Jun. 26, 2008

(30) Foreign Application Priority Data

Nov. 6, 2006 (JP) ............................. 2006-300623

(51) Int. Cl.
*B62D 25/18* (2006.01)
(52) U.S. Cl. .................. 280/152.05; 280/851; 280/154; 280/152.3; 296/198
(58) Field of Classification Search ................. 280/847, 280/152.05, 152.1, 152.2, 152.3, 154, 849, 280/850, 851, 852; 296/37.1, 197, 1, 100, 296/198
See application file for complete search history.

(56) References Cited

U.S. PATENT DOCUMENTS 6,155,624 A * 12/2000 Bienenstein, Jr. .......... 296/37.1

| 6,634,664 | B1 * | 10/2003 | Kojima | 280/288.4 |
| 7,325,639 | B2 * | 2/2008 | Yamaguchi et al. | 180/219 |
| 2002/0109347 | A1 * | 8/2002 | Sheppard | 280/851 |
| 2003/0116937 | A1 * | 6/2003 | Blythe | 280/152.1 |
| 2005/0116508 | A1 * | 6/2005 | Sebastian | 296/198 |
| 2008/0067837 | A1 * | 3/2008 | Thakar et al. | 296/198 |

FOREIGN PATENT DOCUMENTS

| JP | 02182587 A | * 7/1990 |
| JP | 4-52145 | 12/1992 |
| JP | 5-72314 | 10/1993 |

* cited by examiner

*Primary Examiner*—Ruth Ilan
*Assistant Examiner*—John R Olszewski
(74) *Attorney, Agent, or Firm*—Knobbe, Martens, Olson & Bear LLP

(57) ABSTRACT

A splash shield for an automobile which is adapted to be mounted on a vehicle panel of the automobile, wherein the splash shield is adapted to be conform to the vehicle panel and to cover a tire, the splash shield comprises: at least two divided portions which are arranged in a front-rear direction of the automobile; a hinge which pivotably connects the divided portions to each other; at least two vertical walls which are formed on edges of the at least two divided portions and extend in a direction that is away from a rotation center of the tire, wherein two vertical walls from among the at least two vertical walls are formed on the edges of two divided portions from among the at least two divided portions, respectively, the two divided portions being adjacent to each other, and wherein the two vertical walls are arranged adjacent to each other on both sides of a gap that is located at a position that corresponds to the hinge, respectively; and a shielding member for covering the gap, the shielding member being fixed to at least one of the two vertical walls.

8 Claims, 5 Drawing Sheets

SPLASH SHIELD FOR AUTOMOBILE HAVING VERTICAL WALLS AND SHIELDING MEMBER THEREFOR

The present application is based on, and claims priority from, J.P. Application No. 2006-300623, filed on Nov. 6, 2006, the disclosure of which is hereby incorporated by reference herein in its entirety.

BACKGROUND OF THE INVENTION

1. Field of the Invention

The present invention relates to a splash shield for an automobile that covers regions above a tire in order to shield vehicle panels against muddy water and the like that is splashed by the tire when the automobile is running.

2. Description of the Related Art

Typically, a portion of a vehicle panel that covers the upper surface of a tire of an automobile forms an arch-shaped wheelhouse that receives a tire. A splash shield, which is made of synthetic resin and which is formed in conformity with the vehicle panel, is mounted on the wheelhouse. The splash shield is provided to protect the vehicle panel against objects, such as muddy water, small stones, ice, snow and the like, that are splashed by the tire when the automobile runs on a rough road or on a wet road, and to prevent such objects from intruding into the inside space of the vehicle panel.

A splash shield of this type is manufactured by forming a composite material, which is made of thermoplastic resin, such as polyethylene resin, and which contains various types of fillers mixed therewith, into a sheet shape, and then by performing vacuum forming or air pressure forming or the like. Thus, a splash shield is formed into a shape that conforms to the shape of a wheelhouse, which is the portion of a vehicle panel on which the splash shield is mounted, and is then fixed to the vehicle panel by means of screws, small screws, clips or the like.

When vacuum forming or air pressure forming is performed, portions of the resin sheet that are subjected to deep drawing tend to be thinner than other portions after the forming process is finished even if the resin sheet has a uniform thickness before forming. Accordingly, when an arch-shaped splash shield that extends along the upper portion of a tire is simply formed in an integral member, end portions of the splash shield that are subjected to deep drawing tend to be thinned. This tendency is remarkable especially for a splash shield for a large automobile because such a splash shield has a larger arc diameter and a larger height when it is finished. Therefore, it is desirable to limit a reduction in thickness that is caused by the forming process, and thereby to prevent a reduction in stiffness, breakage and deformation of the portion that is thinned. The finished product having a large height is also problematic because the size of a mold, as well as manufacturing cost, would be increased.

As a solution to these problems, a technique is known in which a splash shield is formed by combining a plurality of members that are divided in the front-rear direction of an automobile. Japanese Patent Publication No. 72314/93 discloses a further advanced art for a splash shield, as shown in FIG. 1. Splash shield 100 has front-side splash shield 101 and rear-side splash shield 102 that are connected to each other by means of connecting member 103 in the form of a generally flat plate. Specifically, on both sides of splash shields 101, 102, gaps are formed between adjacent side walls that extend in the direction of the tire radius. The portion between the gaps forms connecting member 103. Flange 106 is formed on the side wall such that it projects in the axial direction of the tire and extends along the lower side of the side wall. Through holes 105, which allow screws for fixing the splash shields to a wheelhouse to be inserted, are formed in flange 106. Flange 106 is also divided to form a gap at a position that corresponds to connecting member 103.

Splash shield 100 can allow front-side splash shield 101 and rear-side splash shield 102 to be pivoted relative to each other about connecting member 103 by means of flat connecting member 103. Accordingly, splash shield 100 is formed in an open state with regard to the front-rear direction. This allows a reduction in the height of the finished product. When splash shield 100 is mounted after forming, splash shield 100 is deformed about connecting member 103, and is put in a retracted state with regard to the front-rear direction to conform to the shape of the wheelhouse, as indicated by arrow E in FIG. 1. The gaps between front-side splash shield 101 and rear-side splash shield 102 are thus closed. Overlapped portions between front and rear flanges 106 are fixed to each other by means of screws so that splash shield 100 is mounted in a state in which the gaps are closed.

Japanese Utility Model Publication No. 52145/92 discloses various hinge structures for pivotably connecting portions of a splash shield that are divided in the front-rear direction.

It is desirable for a splash shield for an automobile to prevent foreign objects, such as muddy water, snow and blocks of ice, from intruding into space between the splash shield and the vehicle panel that forms the wheelhouse. This leads to limitation of noise that is caused by foreign objects that intrude into the space, as well as limitation of interference of the splash shield with the tire that is caused by pulling down of the splash shield. To achieve this purpose, a structure having a vertical wall that is connected to an edge of a side wall of a splash shield is known. This vertical wall is turned about the edge of the side wall and extends about an edge of the vehicle panel.

However, if such a vertical wall is applied to the above-mentioned splash shield having portions that are divided in the front-rear direction and that are pivotably connected to each other, then the vertical walls that are formed on the respective divided portions move away from each other due to a pivoting motion during the mounting process. Therefore a large gap is inevitably left between the vertical walls. This gap impairs the effect of limiting intrusion of muddy water, snow and blocks of ice.

Further, when a splash shield having portions that are divided in the front-rear direction and that are connected to each other by means of a hinge is used, it is preferable to limit fluttering of the hinge that may be caused by wind pressure during operation of the automobile, even if the hinge is formed, in particular, in the vicinity of the end portion of the splash shield. This leads to limitation of noise and prevents muddy water, snow and the like from intruding through the gap that is generated by fluttering. To cope with this problem, the number and the interval of fixing means, such as bolts, on the vehicle panel are suitably determined. However, particularly when the above-described vertical wall is used, it is not desirable to provide the vehicle panel with openings for the fixing means from the viewpoint of soundproof. It is even impossible, in some cases, to provide such openings because of the structure of the vehicle panel.

There is a need for other measures to limit fluttering.

SUMMARY OF THE INVENTION

The present invention is directed to a splash shield for an automobile having divided portions that are divided in the front-rear direction and that are connected to each other by a hinge. An object of the present invention is to limit, as much as possible, foreign objects that intrude through a gap between vertical walls that move away from each other when the divided portions are pivoted about the hinge during mounting. Another object of the present invention is to limit, as much as possible, fluttering of the splash shield during operation of the automobile.

To achieve the object of the present invention, a splash shield for an automobile which is adapted to be mounted on a vehicle panel of the automobile, wherein the splash shield is adapted to be conform to the vehicle panel and to cover a tire, the splash shield comprises: at least two divided portions which are arranged in a front-rear direction of the automobile; a hinge which pivotably connects the divided portions to each other; at least two vertical walls which are formed on edges of the at least two divided portions and extend in a direction that is away from a rotation center of the tire, wherein two vertical walls from among the at least two vertical walls are formed on the edges of two divided portions from among the at least two divided portions, respectively, the two divided portions being adjacent to each other, and wherein the two vertical walls are arranged adjacent to each other on both sides of a gap that is located at a position that corresponds to the. hinge, respectively; and a shielding member for covering the gap, the shielding member being fixed to at least one of the two vertical walls.

According to the splash shield thus constructed, since a plurality of divided portions are connected to each other by the hinge, the height of the finished product that is used as a splash shield for an automobile can be reduced, which enables satisfactory and efficient forming work. The vertical walls function to limit foreign objects, such as muddy water, that are splashed by the tire and that intrude into the space between the splash shield and the vehicle panel. Since the vertical walls extend in a direction that is away from the rotation center of the tire, the two vertical walls that are arranged adjacent to each other on both sides of the gap, which is located at the position that corresponds to the hinge, move away from each other by a pivoting motion about the hinge that occurs after forming. Therefore, a gap is inevitably left between both vertical walls. By providing a shielding member for covering the gap, deterioration of the shielding effect of the vertical walls against foreign objects can be reduced.

Preferably, the shielding member is formed such that it extends from an edge of the vertical wall and is folded along the edge of the vertical wall so that the shielding member is placed at a position for covering the gap. According to this construction, in which the shielding member is formed integrally with the vertical wall, an increase in the number of components is avoided, and therefore, workability and efficiency of the operation to mount the shielding member can be improved.

Further, it is preferable to form a ridge which is provided at an edge of the vertical wall, the ridge extending along a fold line along which the shielding member is folded. By providing such a ridge, inaccuracy of the folding position of the shielding member is reduced, and workability in folding the shielding member can be improved.

It is preferable to fix the shielding member to both of the two vertical walls that are arranged on both sides of the gap. This construction improves stability and durability of the shielding member. Further, by connecting the two vertical walls to each other, stiffness, and therefore, stability and durability of the vertical walls can be improved. After being fixed, the shielding member can limit a pivoting motion between the two divided portions on which the vertical walls connected by the shielding member are provided, respectively.

According to the present invention, in the splash shield having a plurality of divided portions that are connected to each other by a hinge, foreign objects that intrude through the gap between the vertical walls that move away from each other when the divided portions are pivoted about the hinge during mounting, can be limited as much as possible by the shielding member.

Further, by fixing the shielding member to both vertical walls, stiffness of the vertical walls, and therefore, shielding performance of the vertical walls can be improved. Moreover, a pivoting motion between the two divided portions on which the two vertical walls are provided is limited, and thereby fluttering of the splash shield is also limited.

The above and other objects, features and advantages of the present invention will become apparent from the following description with reference to the accompanying drawings which illustrate examples of the present invention.

DETAILED DESCRIPTION OF THE INVENTION

A preferred embodiment of the present invention will be described with reference to the accompanying drawings.

Figure 1:
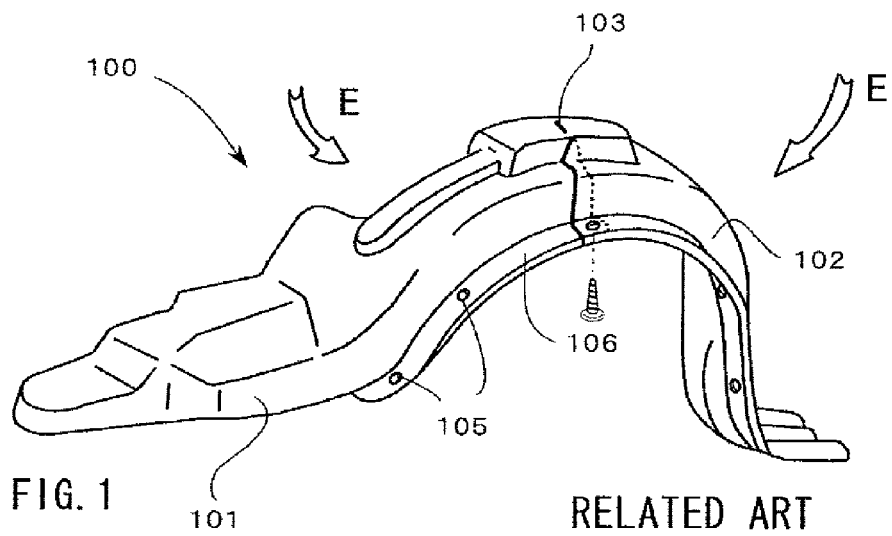
FIG. 1 is a perspective view of a conventional splash shield for an automobile.
Figure 2:
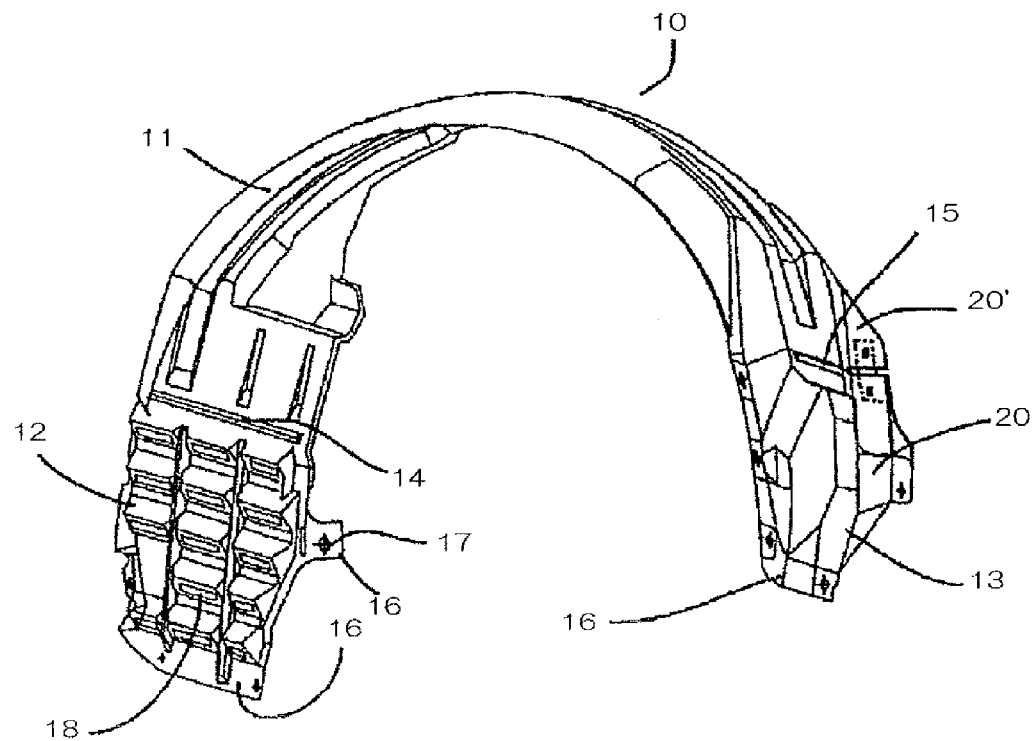
FIG. 2 is a perspective view generally showing a splash shield for an automobile according to an embodiment of the present invention.

FIG. 2 is a perspective view generally showing splash shield 10 for an automobile according to the present embodiment. In the present embodiment, splash shield 10 that is adapted to be mounted above a front left wheel with respect to the running direction of an automobile is illustrated as an example.

Splash shield 10 has three divided portions 11-13, which are main body portion 11 that is located at the center with regard to the front-rear direction of an automobile, front and rear expanded portions 12, 13 that are positioned in front of and at the rear of main body portion 11, respectively. Splash shield 10 also has hinges 14, 15 for connecting the divided portions 11-13. Hinge 14 is configured to allow main body portion 11 and front expanded portion 12 to be pivoted about each other. Hinge 15 is configured to allow main body portion 11 and rear expanded portion 13 to be pivoted about each other. Various conventional structures can be adopted for the hinge structure, and detailed description thereof is omitted. After splash shield 10 is formed, as described later, front expanded portion 12 and rear expanded portion 13 are pivoted about hinges 14, 15 so that splash shield 10 is deformed in an arched-shape, as shown in FIG. 2.

Figure 3:
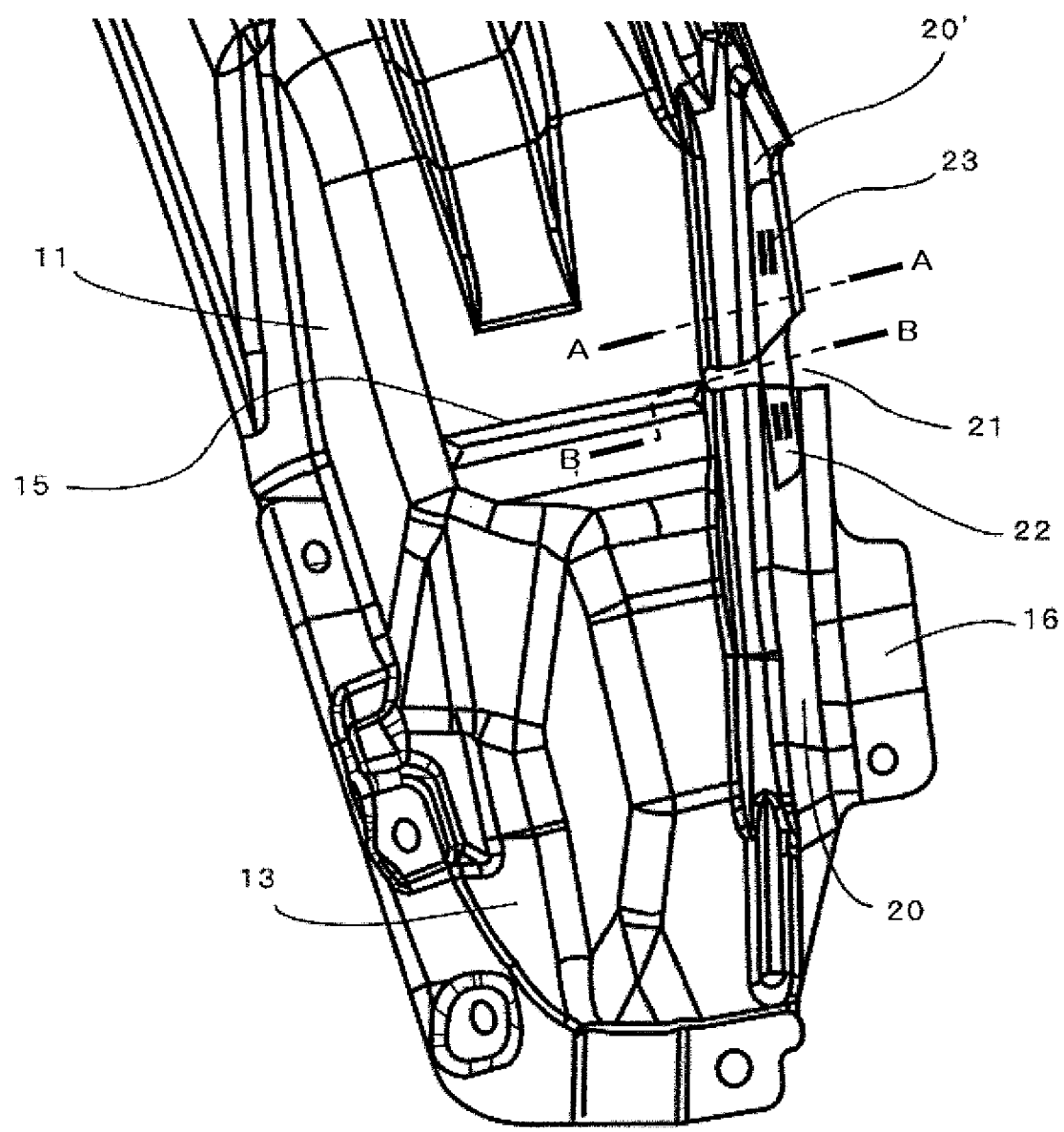
FIG. 3 is an enlarged perspective view of the portion of the splash shield of FIG. 2 that connects the main body portion and the rear expanded portion.
Figure 4:
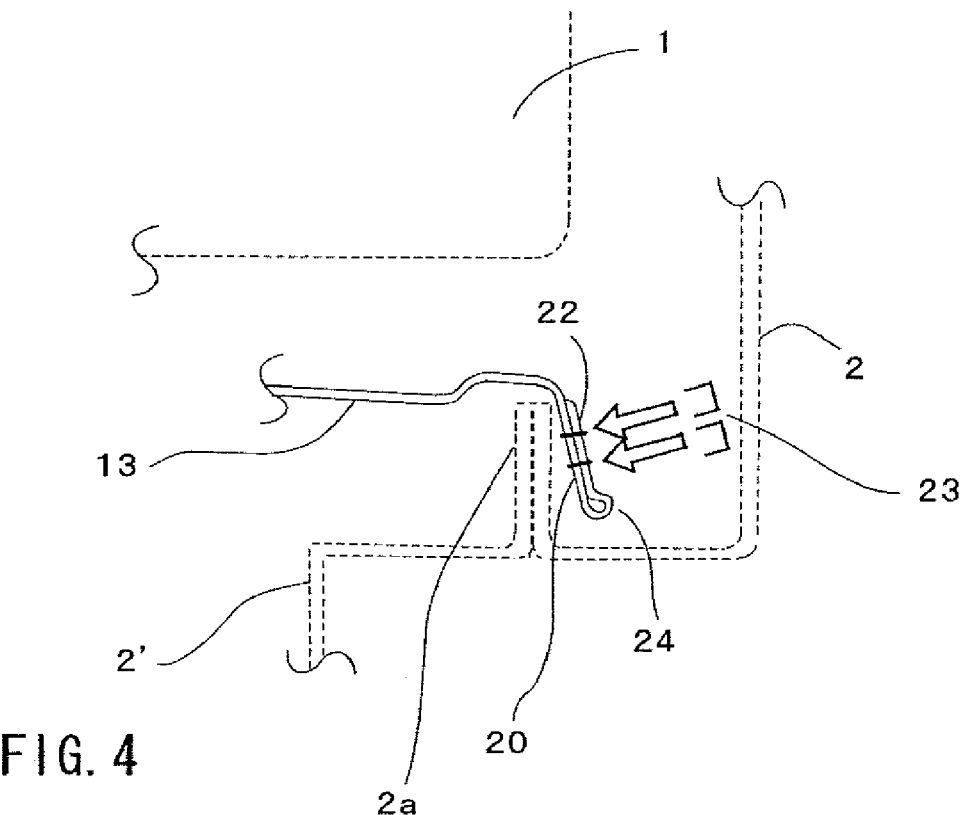
FIG. 4 is a sectional view taken along line A-A in FIG. 3.
Figure 5:
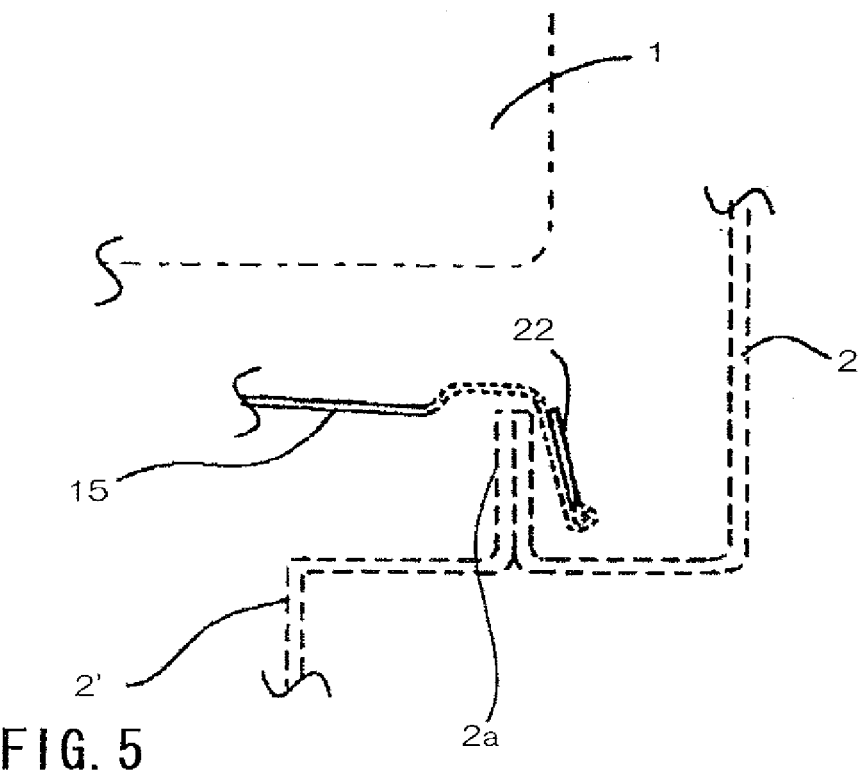
FIG. 5 is a sectional view taken along line B-B in FIG. 3.
Figure 6:
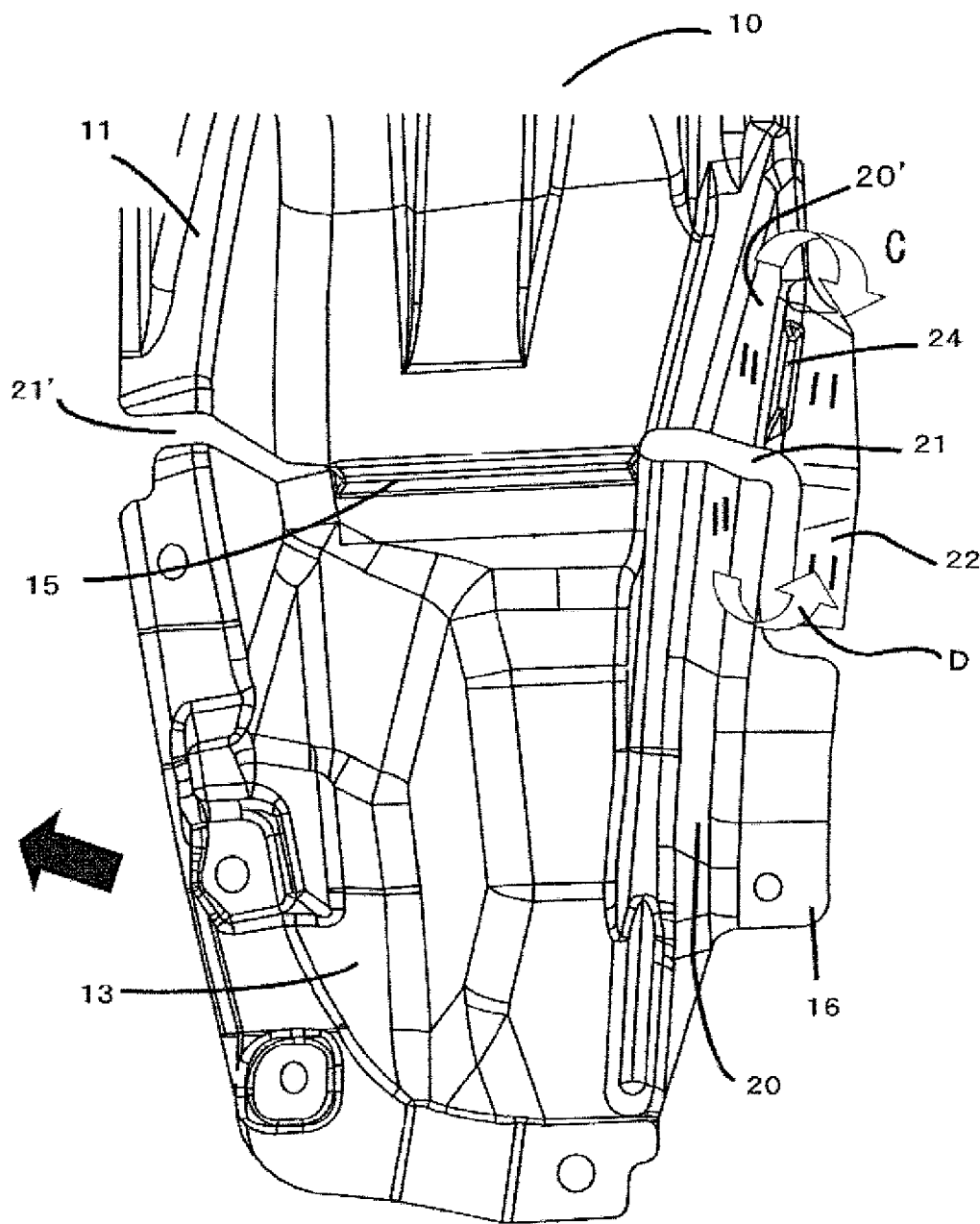
FIG. 6 is a perspective view showing the portion of the splash shield of FIG. 2 that connects the main body portion and the rear expanded portion after the splash shield is formed and cut by a cutting die.

FIG. 3 is an enlarged perspective view of the connecting portion between main body portion 11 and rear expanded portion 13. FIG. 4 is a sectional view taken along line A-A in FIG. 3, and FIG. 5 is a sectional view taken along line B-B in FIG. 3. In these figures, tire 1 and vehicle panels 2, 2' that are to be positioned near splash shield 10 are indicated by the broken lines. FIG. 6 is a perspective view of the connecting portion before rear expanded portion 13 is pivoted.

Splash shield 10 for an automobile is a member generally in the form of a sheet that is made of thermoplastic resin. Splash shield 10 is configured to be mounted along vehicle panels 2, 2', such as a fender panel, a bumper flange or an engine undercover, and has a generally arched-shape that extends in the front-rear direction of an automobile to conform to the shapes of vehicle panels 2, 2'.

Mounting portions 16 are formed in front expanded portion 12 and rear expanded portion 13 such that they project from the edges of front expanded portion 12 and rear expanded portion 13. Openings 17 that allow bolts for mounting splash shield 10 on vehicle panels 2, 2' to be inserted are provided in mounting portions 16. Splash shield 10 is attached to vehicle panels 2, 2' by inserting the bolts into openings 17 and holes, not shown, that are provided at predetermined positions of vehicle panels 2, 2', and by fastening the bolts by means of nuts. Splash shield 10 is thus mounted on a predetermined position of vehicle panels 2, 2' such that front expanded portion 12 is arranged on the front side of the automobile while rear expanded portion 13 is arranged on the rear side of the automobile. Splash shield 10 that is thus mounted at a predetermined position between tire 1 and vehicle panels 2, 2' functions to shield and protect the vehicle panels against water, ice and snow, small stones and the like that are splashed by tire 1 during operation of the automobile.

Splash shield 10 is provided with various projections and recesses in order to provide large stiffness, shape maintainability and durability, and thereby to mitigate problems, such as deformation and noise caused by bending. Further, many air vent openings 18 are provided in front expanded portion 12 in order to allow air flow that collides against front expanded portion 12 during operation to pass through openings 18, and thereby to limit fluttering.

During operation of the automobile, splash shield 10 receives the largest amount of muddy water, small stones and the like, which is splashed by tire 1, on the rear interior side of the automobile. Therefore, if no measures are taken, muddy water, small stones and the like are more apt to intrude into the space between vehicle panel 2' and splash shield 10 on the rear interior side of the automobile. If a large amount of foreign objects intrude into the space between vehicle panel 2' and splash shield 10, the foreign objects may cause noise, as well as deformation or a change in position of splash shield 10. Deformation or a change in position of splash shield 10 may lead to problems concerning the opening/closing operation of a door panel if the door panel is positioned at the rear of or above splash shield 10. Deformation or a change in position of splash shield 10 may also cause interference between tire 1 and splash shield 10. Especially in the winter season, the influence described above tends to increase because of freezing of water that intrudes into the space or because of accumulation of a large amount of ice or snow.

Therefore, splash shield 10 is provided with vertical walls 20, 20' on the right edge of splash shield 10, which corresponds to the rear interior side of the automobile. Vertical walls 20, 20' project outwardly as seen from the center of the arched-shape of splash shield 10. In other words, vertical walls 20, 20' project in a direction away from the rotation center of tire 1. Vertical walls 20, 20' are arranged such that they turn about flange 2a that is formed by vehicle panels 2, 2', as shown in FIG. 4. Vertical walls 20, 20' function to limit muddy water or the like that is splashed by tire 1 and that intrudes into the space between vehicle panel 2' and splash shield 10.

Vertical wall 20 is formed in rear expanded portion 13, while vertical wall 20' is formed in main body portion 11. In order to allow rear expanded portion 13 and main body portion 11 to be pivoted about hinge 15 relative to each other, gap 21 is required between vertical wall 20 and vertical wall 20'. Since vertical walls 20, 20' project outwardly from the arc, gap 21 is not closed by overlapping of vertical walls 20, 20' when rear expanded portion 13 is pivoted after forming. On the contrary, gap 21 opens wider due to an increase in the distance between vertical walls 20, 20' that is caused by a pivoting motion after forming.

Splash shield 10 according to the present embodiment has shielding member 22 that is connected to vertical walls 20, 20' and that is placed across gap 21 to cover gap 21. Shielding member 22 is formed integrally with vertical wall 20' at the time of forming. Shielding member 22 is connected to vertical wall 20' and extends in the lateral direction of the automobile from the upper edge of vertical wall 20' toward vertical wall 20, as shown in FIG. 6. Shielding member 22 is arranged such that it is folded outwardly about a fold line that corresponds to the upper edge of vertical wall 20', as indicated by arrow C in FIG. 6, and such that it is thereby arranged between vertical wall 20 and vertical wall 20'. Shielding member 22 thus folded is fixed to vertical walls 20, 20' at two positions of each wall by means of staples 23, as shown in FIG. 3.

In this way, gap 21, which is generated between vertical walls 20, 20' as a result of providing hinge 15, is covered with shielding member 22, and the intrusion of muddy water, ice, snow and the like through gap 21 is limited as much as possible. Accordingly, the effect of limiting the intrusion of foreign objects is obtained over the entire region in which vertical walls 20, 20' and shielding member 22 are provided, and intrusion of foreign objects, such as muddy water, ice and snow into the space between vehicle panel 2' and splash shield 10 is effectively limited.

Further, since vertical walls 20, 20' are connected by shielding member 22, the stiffness of vertical walls 20, 20', and accordingly, the shielding effect of the vertical walls, is improved. Furthermore, since a pivoting motion of rear expanded portion 13 and main body portion 11 is limited by shielding member 22 after shielding member 22 is attached, the effect of limiting fluttering of the edge portions of main body portion 11 and rear expanded portion 13 can be obtained. Limitation of fluttering leads to a reduction in noise that is caused by fluttering and a reduction in ice and snow and the like that intrude through the gap that occurs due to fluttering.

A preferred method for manufacturing the splash shield for an automobile according to the present embodiment will now be described.

Splash shield 10 is preferably made of a material that contains a high-density polyethylene resin, ABS resin or elastomer as base material and that contains talc or glass fibers that are mixed with the base material as fillers. Other preferable material includes fibrous material, such as nonwoven fabric. A composite material that mainly consists of such thermoplastic resin is put in a screw extruder first. The composite material is then heated and kneaded into a plastic state, and then extruded in a sheet form through a T-die that is attached to an end of the screw extruder.

Subsequently, the resin sheet that is extruded is put into a mold before it is cooled and solidified, and is then subjected to vacuum forming or air pressure forming. When forming is conducted, splash shield 10 is not formed in a shape that is generally arched in the front-rear direction, but is formed such that portions that correspond to front expanded portion 12 and rear expanded portion 13 are bent at positions that correspond to hinges 14, 15. Thus, the height of the splash shield can be limited as compared to a splash shield that is formed to have a shape that is generally arched in the front-rear direction. This leads to a reduction in the height of the mold. This also enables single-step molding without requiring undercutting, and contributes to a reduction in the stroke of the mold in the molding step. Accordingly, a mold having a simple structure can be used, and pressing time also can be reduced, leading to an efficient forming process. The low profile of the splash shield also allows a reduction in the depth of the cavity of the mold, as well as in the amount of drawing, and thereby prevents the splash shield from being excessively thinned.

After forming, unnecessary portions along the outer peripheral of the product are trimmed by manual operation, and the product is subjected to secondary trimming in a cutting die. By trimming the outer peripheral portion, appearance of the product is improved. Gaps 21, 21' shown in FIG. 6 are also formed in this trimming step. As a result, the portion in the vicinity of hinge 15 that connects main body portion 11 and rear expanded portion 13 is formed in the state that is shown in FIG. 6.

In more detail, the portion that corresponds to vertical walls 20, 20' not shown, is formed as an integral portion that substantially perpendicularly extends from the main plane of the portion that corresponds to main body portion 11 and rear expanded portion 13 before trimming is performed. Shielding member 22 is formed as a portion, which is integrated with mounting portion 16, that projects substantially perpendicularly and outwardly from the upper edge of the portion that corresponds to vertical walls 20, 20'. In other words, this portion projects generally in parallel with the main plane of the portion that corresponds to main body portion 11 and rear expanded portion 13. In the trimming process using a cutting dies, a single continuous gap having a generally S-shape is formed between vertical walls 20, 20' and between mounting portion 16 and shielding member 22, as shown on the right side of FIG. 6. In this way, vertical walls 20, 20' that are divided by gap 21, as well as shielding member 22 that extends from vertical wall 20 toward vertical wall 20', are formed. Also, as shown on the left side of FIG. 6, the portion that extends from the main plane of the portion that corresponds to main body portion 11 and rear expanded portion 13 is separated by gap 21', thereby allowing main body portion 11 and rear expanded portion 13 to be pivoted relative to each other about hinge 15 that is formed as a remaining portion between gaps 21, 21'.

In the present embodiment, rear expanded portion 13 is thereafter pivoted about 30 degrees in the direction of arrow D in FIG. 6 in order to form splash shield 10 into an arched shape that conforms to vehicle panels 2, 2'. Shielding member 22 is folded about the upper edge of vertical wall 20'. Preferably, ridge 24 that extends along the fold line is formed on a portion that corresponds to the folding portion, as shown in FIG. 6. Ridge 24 makes the folding position clearly visible and also functions as a fold, thereby improving workability and reducing inaccuracy.

After folding shielding member 22, shielding member 22 extends between vertical walls 20, 20' and is located at a position that covers gap 21. In this state, shielding member 22 is fixed to vertical walls 20, 20' by means of staples 23.

As described above, the splash shield for an automobile according to the present embodiment has a structure in which three divided portions that are divided in the front-rear direction of an automobile are connected to each other by hinges, and therefore, enables satisfactory and effective manufacturing using molding. Further, vertical walls that project from the splash shield toward the vehicle panels on which the splash shield is mounted prevent foreign objects, such as muddy water, that are splashed by the tire, from intruding into the space between the splash shield and the main body panel of the automobile. The formation of the gap located at the hinge is inevitable for a structure that has a plurality of portions that are divided in the front-rear direction and that has vertical walls provided thereon. However, due to the shielding member for covering the gap that extends between the vertical walls that are divided in the front-rear direction with the gap interposed therebetween, the splash shield according to the present embodiment avoids the problem in which the shielding effect of the vertical walls against foreign objects is eliminated by the gap. After being fixed, the shielding member also functions to limit a pivoting motion of the splash shield about the hinge and to reduce fluttering of the splash shield.

The above-described embodiment is only exemplary for the present invention. Various modifications may be made with regard to the details of the embodiment. For example, shielding member 22 may be formed as an independent member, although it makes more sense and is more rational and preferable to integrate shielding member 22 with splash shield 10 from the viewpoint of workability. While shielding member 22 is fixed to vertical walls 20, 20' at both ends of shielding member 22 in the present embodiment, shielding member 22 does not need to be fixed on the side of vertical wall 20. Shielding member 22 that is fixed on both ends is advantageous from the viewpoint of an improvement in stability and durability, as well as from the viewpoint of limiting fluttering, as described above. However, if shielding member 22 is expected to provide sufficient stability and durability due to the stiffness thereof, then omission of fixation on one side may be lead to an improvement in manufacturing efficiency and a reduction in manufacturing cost.

Although an exemplary fixing means to fix shielding member 22 to vertical walls 20, 20' using staples 23 is described in the present embodiment, fixing means are not limited to this. Fixing means using, for example, an adhesive, high-frequency seizing, ultrasonic seizing or a magic fastener may also be used. Also, shielding member 22 may be fixed to vertical walls 20, 20' by means of protrusions, which are provided on either shielding member 22 or vertical walls 20, 20', and holes, which are provided on the other, that engages with the protrusions by inserting the protrusions into the holes for engagement.

Figure 7A:
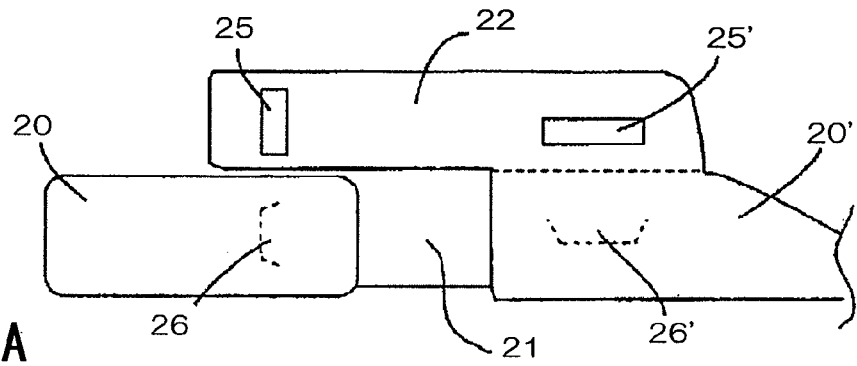
FIGS. 7A and 7B are diagrams schematically showing a modified example of the splash shield of FIG. 2.
Figure 7B:
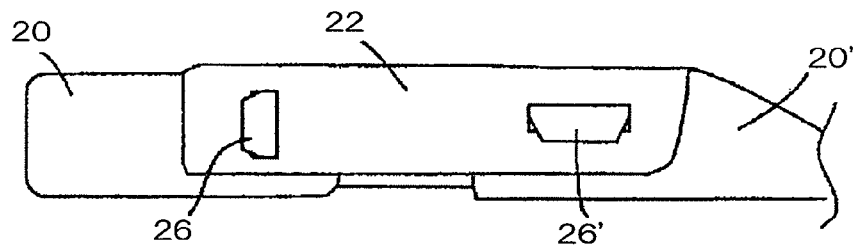
Figure 8A:
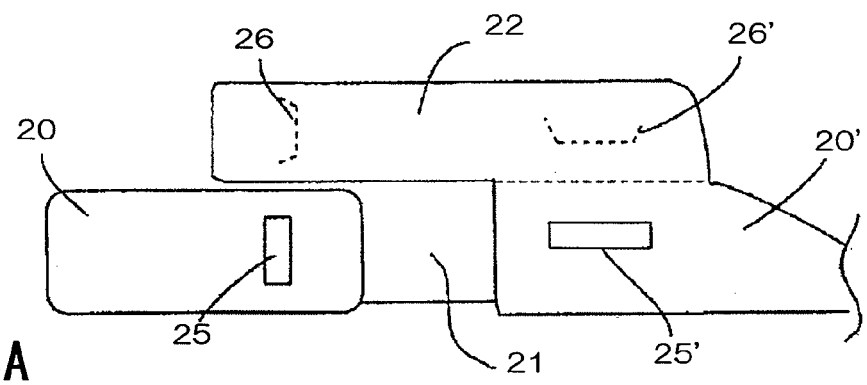
FIGS. 8A and 8B are diagrams schematically showing another modified example of the splash shield of FIG. 2.
Figure 8B:
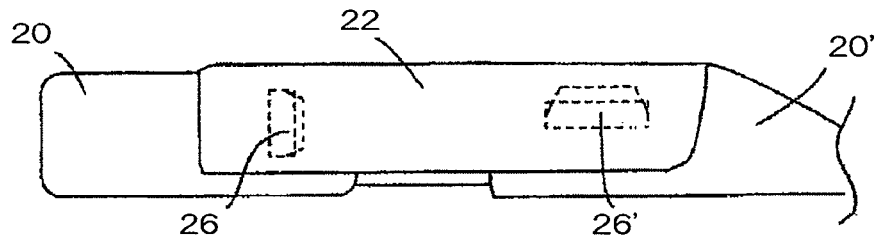

FIGS. 7A to 8B show modified examples that enables fixation of shielding member 22 without a fixing tool, such as a tacker. FIGS. 7A and 8A are diagrams schematically showing shielding member 22 and vertical walls 20, 20' after vacuum or air pressure forming is performed and gap 21 is formed by means of a cutting die. FIGS. 7B and 8B are diagrams schematically showing the state in which shielding member 22 is folded and fixed.

In the modified example shown in FIGS. 7A and 7B, cuts are formed in vertical walls 20, 20' so as to form tongues 26, 26', as indicated by the broken lines. Through holes 25, 25' are formed in shielding member 22 at positions that correspond to tongues 26, 26' when shielding member 22 is folded. Shielding member 22 is folded along the broken line in FIG. 7A and is fixed to vertical walls 20, 20' by inserting tongue 26' into hole 25' for engagement with hole 25' and by inserting tongue 26 into hole 25 for engagement, as shown in FIG. 7B.

In the modified example shown in FIGS. 8A and 8B, tongues 26, 26' that are similar to the tongues in FIGS. 7A and 7B are provided in shielding member 22, while through holes 25, 25' are formed in vertical walls 20, 20'. In this example shown in FIGS. 8A and 8B, shielding member 22 is similarly folded along the broken line in FIG. 8A and is fixed to vertical walls 20, 20' by engaging tongue 26' with through hole 25' and by engaging tongue 26 with through hole 25, as shown in FIG. 8B.

The arrangements shown in FIGS. 7A to 8B contribute to cost reduction because they do not require a fixing tool, such as a tacker or an adhesive. Further, since shielding member 22 is easily fixed to vertical walls 20, 20', work efficiency can be improved.

Although certain preferred embodiments of the present invention have been shown and described in detail, it should be understood that various changes and modifications may be made without departing from the spirit or scope of the appended claims.

What is claimed is:

1. A splash shield for an automobile which is adapted to be mounted on a vehicle panel of the automobile, wherein said splash shield is adapted to conform to said vehicle panel and to cover a tire, said vehicle panel forming a flange that extends from the vehicle panel toward the tire, said splash shield comprising:
   at least two divided portions which are arranged in a front-rear direction of the automobile;
   a hinge which pivotably connects said divided portions to each other;
   at least two vertical walls which are formed on edges of said at least two divided portions and extend in a direction that is away from a rotation center of the tire, said at least two vertical walls are aligned in the front-rear direction and turn about said flange, wherein two vertical walls from among said at least two vertical walls are formed on said edges of two divided portions from among said at least two divided portions, respectively, said two divided portions being adjacent to each other, and wherein said two vertical walls are arranged adjacent to each other on both sides of a gap that is located at a position that corresponds to said hinge, respectively; and
   a shielding member for covering said gap, said shielding member being fixed to at least one of said two vertical walls.

2. The splash shield according to claim 1, wherein said shielding member is formed such that it extends from an edge of said vertical wall and is folded along said edge of said vertical wall so that said shielding member is placed at a position for covering said gap.

3. The splash shield according to claim 2, further comprising a ridge which is provided at an edge of said vertical wall, said ridge extending along a fold line along which said shielding member is folded.

4. The splash shield according to claim 1, wherein said shielding member is fixed to both of said two vertical walls.

5. A splash shield for an automobile having a configuration conforming to a vehicle panel of the automobile to cover a tire, said vehicle panel forming a flange that extends from the vehicle panel toward the tire, said splash shield comprising:
   at least two divided portions which are arranged in a front-rear direction of the automobile;
   a hinge which pivotably connects said divided portions to each other;
   at least two vertical walls which extend from edges of said at least two divided portions in a direction away from a rotation center of the tire and which are aligned in the front-rear direction with a gap provided therebetween, and turn about said flange; and
   a shielding member for covering said gap, said shielding member being an extension of and the same piece as one of said two vertical walls.

6. The splash shield according to claim 5, wherein the shielding member is folded and placed on the two vertical walls so as to bridge the two vertical walls to cover the gap between the two vertical walls, wherein the shielding member is fixed to the other one of the two vertical walls.

7. The splash shield according to claim 6, wherein the shielding member is folded and latched to both of the two vertical walls.

8. The splash shielding according to claim 5, wherein the divided potions, the vertical walls, and the shielding member are made of a material containing a high-density polyethylene resin, an ABS resin, or an elastomer as a base material.

* * * * *